Figure 2:
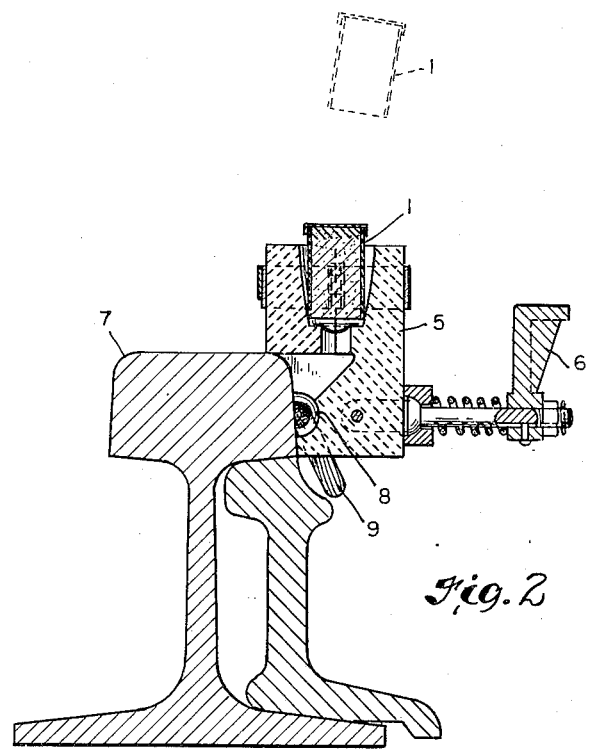

Sept. 20, 1949.  N. G. CARLSON  2,482,093
PROCESS FOR ALUMINOTHERMIC WELDING
Filed Aug. 21, 1946

INVENTOR.
NOBLE G. CARLSON
BY
Oberlin & Limbach
ATTORNEYS.

Patented Sept. 20, 1949

2,482,093

UNITED STATES PATENT OFFICE 2,482,093

PROCESS FOR ALUMINOTHERMIC WELDING

Noble G. Carlson, Cleveland Heights, Ohio, assignor to The Electric Railway Improvement Company, Cleveland, Ohio, a corporation of Ohio Application August 21, 1946, Serial No. 691,926

5 Claims. (Cl. 75—27)

The present improvements relate as indicated to welding, and have more particular regard to a method of welding in which the molten metal employed in the operation is produced by the exothermic reaction between a metallic oxide and a strong reducing agent such as aluminum. Actually the improved method and composition utilized in the production of such molten metal is not limited to the particular use to which the latter may be put, e. g. welding, but such method and material may be employed for other purposes, as for the production of castings or the like.

In U. S. Patent No. 2,229,045 to C. A. Cadwell, dated January 21, 1941, there is disclosed a method and composition of materials whereby such an exothermic reaction may be utilized in the production of molten metallic copper, despite the great speed with which the reaction takes place and the excessive heat evolved. Briefly stated, such previously disclosed improvement resides in the use, instead of aluminum by itself, of sufficient copper as metal (preferably in the form of an alloy) with the aluminum to absorb a substantial amount of the heat generated by the reaction. At the same time there is obtained an increased amount of copper made up of that produced by reduction of the oxide plus the copper present as such in the mixture.

Molten copper produced by use of the material and in the manner set forth in the cited patent has been found highly satisfactory for use in welding copper bonds to steel rails. However, particularly where a charge or "shot" of molten copper is required in small amount only, as for example in welding small size, e. g. signal bonds, to rails by exothermic reaction, difficulty has been encountered in accurately controlling the speed of such reaction and in avoiding a spattering of the molten metal. Also a further difficulty is encountered in that, due to the rapid chilling of the molten metal thus produced by exothermic reaction, where a cold mold is employed, there is a tendency for such metal to solidify in other than desired solid form but instead to become puffy with escaping gas. The source of the latter phenomenon has been attributed to various causes, including adsorption of gases on the surface of the material whereof the crucible and mold are formed and to the absorption of vapor or vapor yielding constituents from the reaction mixture or the starting or ignition powder employed in association therewith. While the condition in question disappears when the crucible and the mold are sufficiently heated, after which the cast metal becomes sound, the difficulty arises anew if the parts in question become cold.

Various measures have been taken to overcome the foregoing difficulty such as preliminarily heating the parts of the crucible and mold that contact with the molten metal; also adding to the mixture gas absorbing or purifying elements such as boron, manganese, silicon and the like, certain of these serving to secure good welding characteristics as well as to displace gas.

I have now discovered that the aforesaid puffy condition in molten copper thus exothermically produced may be easily and simply avoided, irrespective of whether the crucible and mold is cold or heated, by simply adding a small amount of fluoride flux to the exothermic reaction mixture.

My present invention accordingly consists in the steps and composition of ingredients comprising the exothermic reaction mixture hereinafter fully described and particularly pointed out in the claims, the annexed drawing and the following description setting out in detail certain means and one mode of carrying out such invention, such disclosed means and mode illustrating, however, but one of the various ways in which the principle of the invention may be used.

Figure 1:
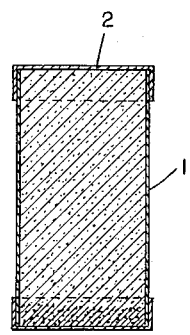

In said annexed drawing:

Fig. 1 is a cross-sectional view of a cartridge wherein my improved exothermic reaction mixture is conveniently placed preparatory to use in a welding operation; and Fig. 2 is a cross-sectional view indicating the manner in which the crucible of a rail bonding apparatus may be charged with such mixture.

As set forth in the above cited Patent No. 2,229,045, a charge found satisfactory for use in welding copper rail bonds to steel rails comprises as its principal ingredients approximately 14.4 parts by weight of roasted copper scale to 5.6 parts of 65-35 Cu-Al alloy, all being finely divided and thoroughly mixed. Upon igniting such a charge there is produced a body of highly heated molten copper, a portion of which is derived from the reducing action of the aluminum on the copper oxide in the copper scale, in accordance with the following equation, viz:

$$3CuO + 2Al = Al_2O_3 + 3Cu$$

The balance is made up of the copper which is found in the scale and of the 65% of copper included in the copper-aluminum alloy.

A typical formula for the composition of a reaction charge of the character described, in which purifying elements such as those mentioned above are included, is as follows, the amounts indicated being percentages by weight, viz:

| | Per cent |
|---|---|
| Copper scale | 75.00 |
| 60-40 alloy | 21.00 |
| Calcium-silicon | 2.50 |
| ZnO | .25 |
| $SnO_2$ | .25 |
| Mn | .25 |
| Mn boride | .25 |
| "Silcaz" 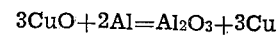 | .25 |

It should be explained that the third ingredient in the above formula may also be designated as calcium silicide, while the last such ingredient is a trade name for a commercial alloy which contains 35 to 40% of silicon, 9 to 11% each of calcium and titanium, 6 to 8% of aluminum, 3 to 5% of zirconium, 0.40 to 0.60% of boron, and the balance iron.

Despite the inclusion of the indicated additional ingredients in the above formula, puffy metal, nevertheless, tends to occur where a cold crucible or mold surface, particularly of graphite, and particularly if coated with a residue from previous charges or "shots," provides a perfect setting for the so-called adsorption of gases. Whatever the cause or the reason for this puffy metal, I have found that a fluoride flux added to the above powder produces sound or solid metal even though the crucible or mold is cold. In short, as a result of such addition, a uniformly sound metal casting will almost invariably be obtained.

Any one of the commercially available fluorides known to be useful as a flux may be satisfactorily used, either alone or in combination, for the purpose indicated. Thus, calcium fluoride, $CaF_2$, commonly known as fluorspar or fluorite, may be used alone although, on account of its high melting point, there may result a slight retardation of the main reaction. Similarly sodium aluminum fluoride, $Na_3AlF_6$, commonly known as cryolite, may be used alone and somewhat more satisfactorily, owing to its lower melting point. However, the best results I have found follow the use of a mixture of fluorspar and cryolite, a eutectic mixture, viz., 25% fluorspar and 75% cryolite being preferred. Ordinarily a 2½% addition of such eutectic mixture to a reaction mixture having the formula given above will be sufficient to prevent the puffy condition which has heretofore given trouble and a smaller proportion of such admixed fluorides will in many cases suffice. Where such addition is in the amount of 2½%, the formula in question will then be substantially as follows, in percentages by weight as before, viz:

|  | Per cent |
| --- | --- |
| Scale | 73.0 |
| Alloy | 21.6 |
| Calcium silicon | 2.2 |
| ZnO | .2 |
| $SnO_2$ | .2 |
| Mn | .2 |
| Mn boride | .2 |
| "Silcaz" | .2 |
| Fluoride flux | 2.2 |

For use in welding a rail bond to a rail as illustrated in Fig. 2 of the drawing, a measured charge of the foregoing composition is desirably placed in a cylindrical container 1, the one end 2 of which constitutes a removable cap. In filling such cartridge a small amount of a starting or igniting powder, as described in the previously cited patent, is desirably first placed in the cartridge, being indicated by a difference in shading in Fig. 1, so that when the cartridge is emptied into a crucible or mold 5 by uncapping the container, quickly turning the same upside down in such crucible, and then withdrawing the container, such starting powder will be found at the top of the deposited mixture. It will be understood that a combustible or preferably a fusible plate or the like is first placed over the sprue opening which connects the bottom of the crucible with the mold cavity proper. The rail bonding apparatus partially illustrated in Fig. 2, it will be understood, constitutes no part of the present invention, such apparatus corresponding with that shown and described in my Patent No. 2,277,014, dated March 17, 1942.

Briefly stated, the apparatus comprises, in addition to the combination crucible and mold 5, a suitable clamping mechanism 6 whereby the mold may be clamped against the rail head 7, such mold having a cavity 8 in which the molten metal resulting from the exothermic reaction is received. The terminal of bond 9 which is to be welded to the rail head is also received in such cavity.

Upon igniting the starting powder which is deposited at the upper end of the charge, the exothermic reaction of the latter very quickly follows and the resultant molten copper drops into the cavity of the mold and surrounds the mold terminal. By utilizing a mixture of ingredients for the charge such as described above, the bond terminal will be interfused with the molten metal resulting from the charge, and the adjacent face of the rail heated to the proper temperature so that the bond is firmly attached to the rail, all without spatter or loss of metal, and the resulting bond head will be uniformly sound, i. e. nonporous.

Other modes of applying the principle of my invention may be employed instead of the one explained, change being made as regards the details described, provided the means stated by any of the following claims or the equivalent of such stated means be employed.

I therefore particularly point out and distinctly claim as my invention:

1. The method of welding a copper bond to steel rails which comprises exothermically reducing copper oxide by means of an aluminum reducing agent admixed with a small amount not substantially in excess of 2½% of a fluoride flux, whereby reduced molten metal is produced, and discharging the said molten metal into a mold in which the copper bond is held against the steel rail whereby the bond is welded to the said rail while porosity in the weld metal is prevented.

2. The method of welding a copper bond to steel rails which comprises exothermically reducing copper oxide by means of an aluminum reducing agent admixed with a small amount not substantially in excess of 2½% of fluorspar, whereby reduced molten metal is produced, and discharging the said molten metal into a mold in which the copper bond is held against the steel rail whereby the bond is welded to the said rail while porosity in the weld metal is prevented.

3. The method of welding a copper bond to steel rails which comprises exothermically reducing copper oxide by means of an aluminum reducing agent admixed with a small amount not substantially in excess of 2½% of cryolite, whereby reduced molten metal is produced, and discharging the said molten metal into a mold in which the copper bond is held against the steel rail whereby the bond is welded to the said rail while porosity in the weld metal is prevented.

4. The method of welding a copper bond to steel rails which comprises exothermically reducing copper oxide by means of an aluminum reducing agent admixed with a small amount not substantially in excess of 2½% of a eutectic mixture of fluorspar and cryolite, whereby reduced molten metal is produced, and discharging the said molten metal into a mold in which the copper bond is held against the steel rail whereby the bond is welded to the said rail while porosity in the weld metal is prevented.

5. The method of welding a copper bond to steel rails which comprises exothermically reducing copper oxide by means of a copper-aluminum alloy reducing agent admixed with a small amount not substantially in excess of 2½% of fluorspar, whereby reduced molten metal is produced, and discharging the said molten metal into a mold in which the copper bond is held against the steel rail whereby the bond is welded to the said rail while porosity in the weld metal is prevented.

NOBLE G. CARLSON.

REFERENCES CITED

The following references are of record in the file of this patent:

UNITED STATES PATENTS

| Number | Name | Date |
| --- | --- | --- |
| 230,369 | Walker | July 20, 1880 |
| 860,799 | Goldschmidt et al. | July 23, 1907 |
| 2,162,938 | Comstock et al. | June 20, 1939 |
| 2,229,045 | Cadwell | Jan. 21, 1941 |
| 2,282,175 | Emerson | May 5, 1942 |
| 2,318,604 | Febrey | May 11, 1943 |